United States Patent [19]
Naftaly

[11] 3,856,208
[45] Dec. 24, 1974

[54] SUPPORT AND COUPLING FOR WATER SPRINKLERS

[76] Inventor: Natan Naftaly, 27 Ousha St., Kiryat Mozkin, Israel

[22] Filed: Aug. 3, 1973

[21] Appl. No.: 385,256

[52] U.S. Cl................ 239/251, 239/265, 239/272, 285/61, 285/197
[51] Int. Cl............................................. B05b 3/06
[58] Field of Search........... 239/DIG. 1, 210, 271, 239/251–262, 264, 265, 280, 272, 239/266–269; 285/61, 197–199

[56] References Cited
UNITED STATES PATENTS

| | | | |
|---|---|---|---|
| 1,959,886 | 5/1934 | Wadsworth | 239/251 X |
| 2,381,740 | 8/1945 | Grelson | 239/251 X |
| 2,946,518 | 7/1960 | Wahlin | 239/266 |
| 3,480,036 | 11/1969 | Ehrens et al. | 285/198 X |

FOREIGN PATENTS OR APPLICATIONS
843,296 6/1970 Canada................................. 285/197

*Primary Examiner*—Lloyd L. King
*Assistant Examiner*—Andres Kashnikow
*Attorney, Agent, or Firm*—Toren, McGeady & Stanger

[57] ABSTRACT

A support and coupling device is described for water sprinklers and the like, the device including a housing for receiving a water distribution line and a water sprinkler pipe, and a connector for connecting the water distribution line to the water sprinkler pipe. The housing further includes a stabilizing tube having a straight portion rotatably adjustable within the housing and a bent end the tip of which is adapted to engage the ground for steadily supporting the housing on sloping or uneven ground.

8 Claims, 5 Drawing Figures

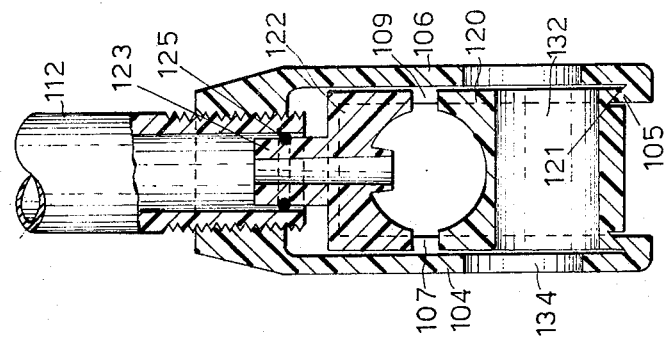
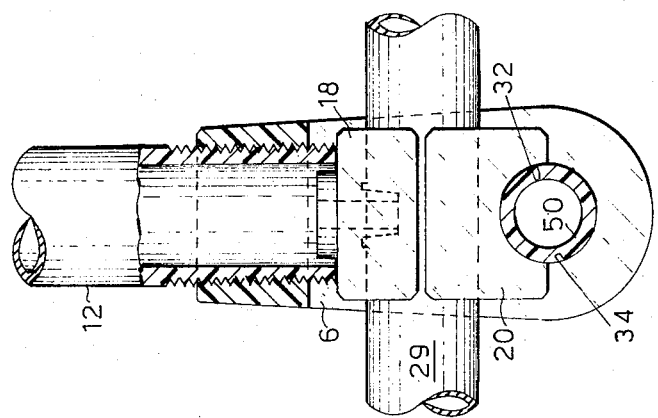
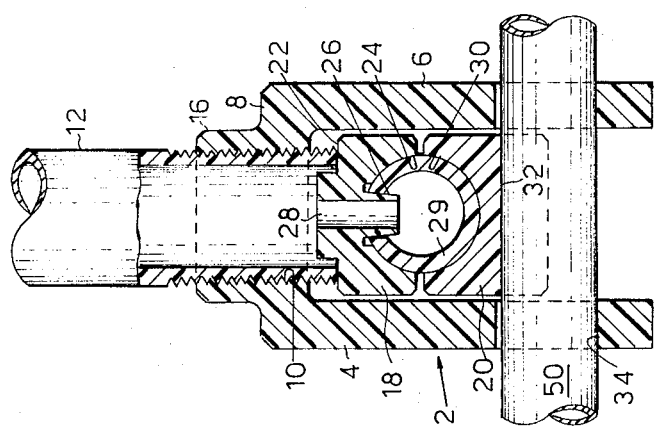
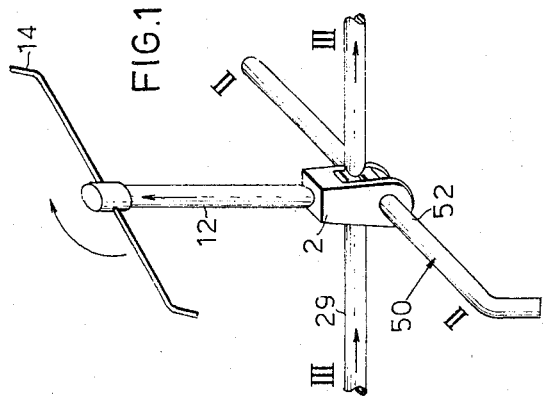
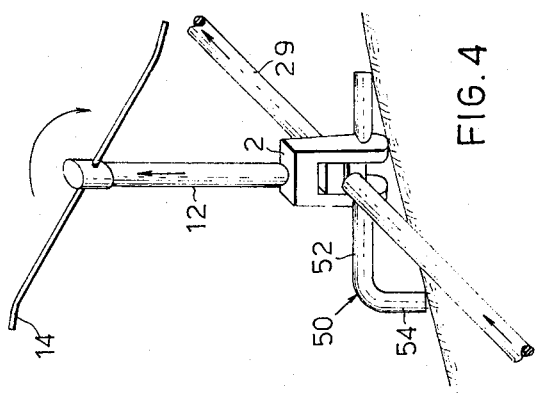

SUPPORT AND COUPLING FOR WATER SPRINKLERS

BACKGROUND OF THE INVENTION

The present invention relates to a support and coupling device for water sprinklers, and particularly to a device for supporting the water sprinkler substantially in a vertical position and for coupling it to a water distribution line.

It is important to support the water sprinkler in a substantially vertical position so that it evenly distributes the water on all its sides. The usual way of doing this is to mount the water sprinkler on a vertical riser pipe which is driven into the ground. However, considerable time and effort are required for driving the riser pipe into the ground and for removing it when it is desired to move the sprinkler. In addition, if the ground is hard or rocky, it may be extremely difficult or impossible to drive the riser pipe into the ground.

A number of stands have been devised for supporting the sprinkler on top of the ground, but the known stands are not entirely satisfactory for supporting the sprinkler in a vertical position when the ground is uneven or sloping.

SUMMARY OF THE INVENTION

An object of the present invention is to provide a support and coupling device for water sprinklers which supports the water sprinkler in a vertical position even on uneven or sloping ground.

Another object of the invention is to provide a support and coupling device for water sprinklers which may be quickly and easily assembled to effect a tight coupling between the water sprinkler and the distribution line, and which may be as easily disassembled.

According to the present invention, the support and coupling device includes a housing for receiving the water distribution line and the water sprinkler pipe, a connector for connecting the water distribution line to the water sprinkler pipe, and a stabilizing tube having a straight portion rotatably adjustable within the housing, and a bent end the tip of which is adapted to engage the ground for steadily supporting the housing on sloping or uneven ground.

According to a further feature, the housing comprises a first opening for receiving the water sprinkler pipe, a second through-going opening intersecting the first opening at right angles for receiving the water distribution line, and a connector member adapted to be interposed between the water sprinkler pipe and the distribution line and including a connector element insertable into the distribution line providing fluid communication to the water sprinkler pipe.

BRIEF DESCRIPTION OF THE DRAWINGS

The invention is herein described, by way of example only, with reference to the accompanying drawings wherein:

FIG. 1 is a perspective view illustrating one form of support and coupling device for water sprinklers constructed in accordance with the invention;

FIG. 2 is an enlarged sectional view along lines II—II of FIG. 1;

FIG. 3 is an enlarged sectional view along lines III—III of FIG. 1;

FIG. 4 illustrates the use of the device for supporting a water sprinkler on sloping ground; and FIG. 5 illustrates several modifications in the device of FIGS. 1 – 3.

DESCRIPTION OF THE PREFERRED EMBODIMENTS

The support and coupling device illustrated in the drawings comprises a housing 2 of inverted U-shape, comprising a pair of spaced parallel legs 4,6 interconnected by a web 8. The web is formed with a threaded opening 10 for receiving the threaded end of the vertical riser pipe 12 to which the water sprinkler 14 is attached. Web 8 may be formed with a collar 16 also having a threaded opening as a continuation of opening 10, for firmly supporting the riser pipe 12.

Disposed between the two legs 4,6 of housing 2 are a pair of blocks 18,20. The upper block 18 is formed with a flat surface 22 at its upper face engageable with the lower end of the riser pipe 12. The lower face of block 18 is formed with a semi-cylindrical recess 24 and with a conical depending projection 26 having a bore 28 passing therethrough. Projection 26 serves as a coupling element insertable into the water distribution line 29 for providing fluid communication to the riser pipe 12.

The lower block 20 is formed on its upper face with a semi-cylindrical recess 30 complementary to recess 24, the lower face of block 20 being formed with another semi-cylindrical recess 32 extending at right angles to recess 30.

The lower ends of the legs 4,6 of the housing are formed with circular openings 34 of the same diameter as the semi-cylindrical recess 32 of block 20.

The device illustrated couples the water distribution line 29 (preferably of plastic such as of polyethylene) to the vertical riser pipe 12 of the water sprinkler and supports the coupling in a steady manner even on sloping or uneven ground. For the latter purpose there is provided a stabilizing tube 50 having a straight portion 52 receivable within the housing of the coupling device, and a bent end 54 located outwardly from the housing and used for steadying the coupling device on the ground.

In assembling the device, riser pipe 12 is first partially (not completely) threaded within opening 10 of housing 2, and then the upper block 18 is inserted between the housing legs with its surface 22 against the lower end of pipe 12. The water distribution line 29 is then passed between the legs of the housing with its upper side facing recess 24; the lower block 20 is inserted with its recess 30 engaging the under side of the water distribution line; and then the straight portion 52 of stabilizing tube 50 is passed through the aligned openings 34 of the housing legs 4,6 with the upper face of the tube seated in the lower semi-cylindrical recess 32 of block 20.

Since the riser pipe 12 is only partially threaded into the housing, the foregoing parts are loosely held, and therefore stabilizing tube 50 may be rotated to bring its bent end 54 into engagement with the ground for steadying the coupling device on uneven or sloping ground as shown in FIG. 4.

Riser pipe 12 is then completely threaded into opening 10 of the housing, thereby forcing block 18 downwardly, whereby its conical connector 26 forms a hole in the water distribution line 29, or seats itself within a hole if one has been made previously. Threading riser part 12 further downwardly effects a tight seal between the conical connector 26 and the water distribution line and also forces the lower block 20 firmly against stabilizing tube 50, thereby firmly holding the stabilizing tube in its adjusted position.

Whenever it is desired to adjust the stabilizing tube 50 to another position, that is with its bent end 54 turned more or less according to the condition of the ground on which the coupling device is supported, it is only necessary to slightly unthread the vertical riser pipe 12 which releases the stabilizing tube 50 for turning to a new position. Similarly, if the seal between the conical connector 26 and the water distribution line 29 is not a good one, it is only necessary to thread vertical pipe 12 further within the housing 2, whereby block 18 and the conical connector 26 will be pressed further into the distribution line. The lower edge of the conical connector 26 may be sharpened if desired to enable it to puncture the distribution line.

The end faces of the two blocks 18 and 20 in contact with the inner face of the two housing legs 4,6 may be formed with complementary ribs and grooves to facilitate assembling the various parts by sliding them into position. In addition, the lower end of the housing legs 4,6 may be formed with skid extensions to facilitate sliding the coupling device (including the distribution line and/or a sprinkler carried thereby) over the ground to other locations by merely pulling on the distribution line.

FIG. 5 illustrates several further modifications. One modification is that an embodiment 123 carrying a sealing ring 125 is formed on the upper surface of the upper block 122 to provide a better seal with the vertical riser pipe 112. A second modification is that the lower block 120 is formed with a complete bore 132 for receiving the stabilizing tube (50, FIGS. 1 – 4). Bore 132 is of the same size as bore 134 through the housing legs 104, 106 but is adapted to be disposed slightly below bore 134, when the riser tube 112 is tightened, so as to tightly clamp tube 50. Further, the lower face of block 120 is formed with grooves 121 receivable on ribs 105 formed at the lower ends of the housing legs 104,106. Lastly, the latter legs are formed with vertical flanges 107 extending along one side to limit the two blocks 122,120 when inserted through the opposite side of the legs.

What is claimed is:

1. A support and coupling device for water sprinklers and the like, including a housing for receiving a water distribution line and a water sprinkler pipe, and a connector for connecting the water distribution line to the water sprinkler pipe, characterised in that the housing further includes a stabilizing tube having a straight portion rotatably adjustable within the housing, and a bent end the tip of which is adapted to engage the ground for steadily supporting the housing on sloping or uneven ground.

2. A device according to claim 1, wherein said housing comprises a first opening for receiving the water sprinkler pipe, a second through-going opening intersecting the first opening at right angles thereto for receiving the water distribution line, and a connector member adapted to be interposed between the water sprinkler pipe and the distribution line and including a connector element insertable into the distribution line providing fluid communication therefrom to the water sprinkler pipe.

3. A device according to claim 2, wherein said first opening in the housing is threaded for threadedly receiving the water sprinkler pipe with the bottom of the pipe engagement with said connector member so that tightening the water sprinkler pipe therein forces said connector element into a tight fit between the distributor line and the sprinkler pipe.

4. A device according to claim 3, wherein said connector member is a block received within said housing and having a semi-cylindrical recess on one face, said housing including a second block having a complementary semi-cylindrical recess on one face, the distribution line being received between the semi-cylindrical recesses of the two blocks.

5. A device according to claim 4, wherein said second block is arranged to receive the straight portion of the stabilizing tube.

6. A device according to claim 5, wherein said housing is formed of an inverted U-shape, said first opening being formed in the web of the U-shape, said two blocks and distribution line being received between the legs of the U-shape, the free ends of the legs of the U-shape being formed with aligned openings for receiving the stabilizing tube.

7. A support and coupling device for water sprinklers, comprising a housing formed with a pair of parallel spaced legs, a threaded opening formed in one end of the housing between its legs for receiving a threaded water sprinkler pipe, a pair of blocks disposed between the legs, complementary faces of said blocks being formed with semicylindrical recesses for receiving therebetween a water distribution line, one of said blocks being formed with a depending conical connector element insertable into the distribution line for providing fluid communication therefrom to the water sprinkler pipe, the lower end of the water sprinkler pipe being engageable with said one block whereby threading the water sprinkler pipe into the housing opening forces the said one block tightly against the distribution line, thereby also forcing the conical connector element of said one block into a tight fit within the distribution line.

8. A device according to claim 7, further including a stabilizing tube having a straight portion clamped by the other of said blocks and the lower ends of the legs of the housing, said stabilizing tube further including a bent end the tip of which is adapted to engage the ground for steadily supporting the housing on sloping or uneven ground.

* * * * *